Figure 5:
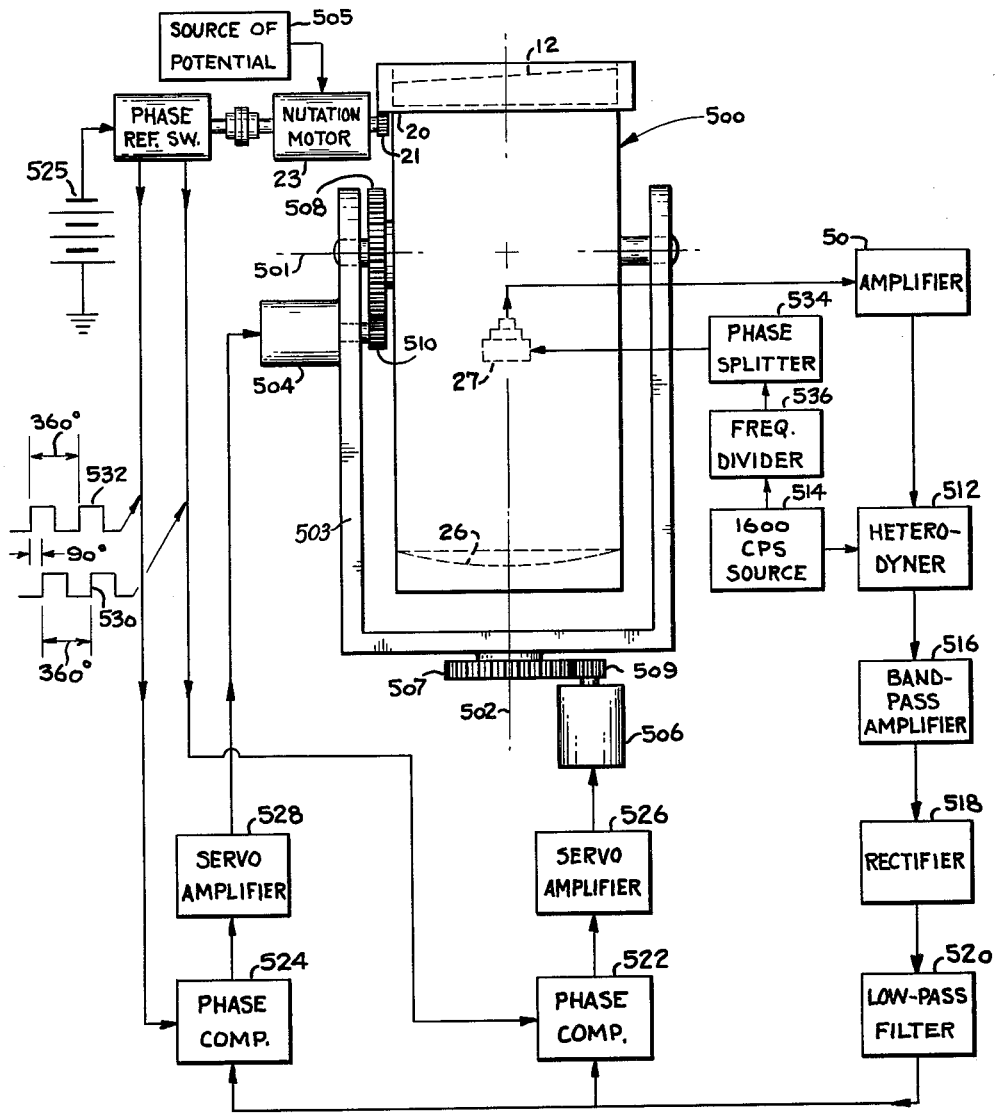

Sept. 11, 1962      H. R. HULETT      3,053,984
STAR TRACKING SYSTEM
Filed Jan. 5, 1951      3 Sheets-Sheet 1
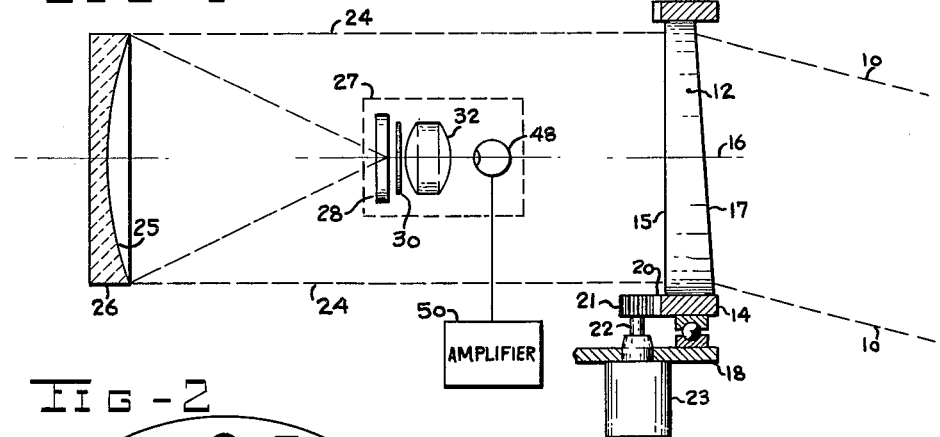
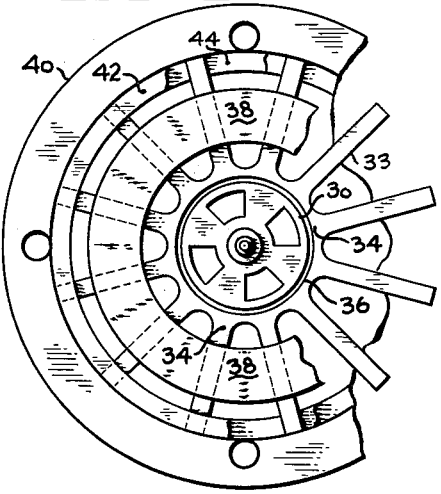
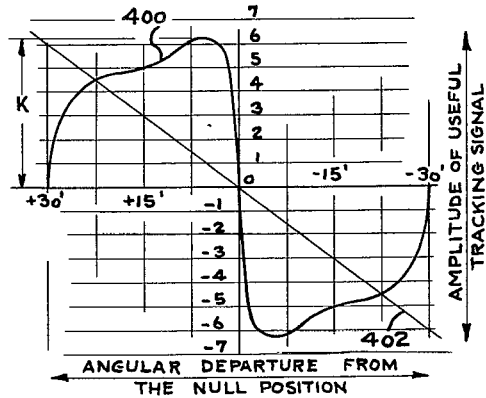
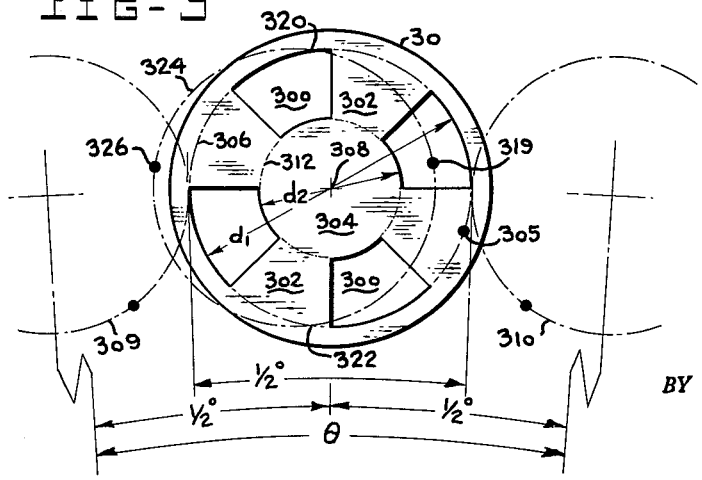
INVENTOR.
HENRY R. HULETT

United States Patent Office 3,053,984
Patented Sept. 11, 1962

3,053,984
STAR TRACKING SYSTEM
Henry R. Hulett, Los Angeles, Calif., assignor, by mesne assignments, to Hughes Aircraft Company, a corporation of Delaware
Filed Jan. 5, 1951, Ser. No. 204,613
11 Claims. (Cl. 250—203)

This invention relates to electrooptical light-detecting apparatus, and more particularly to a star tracking system suitable for star tracking either in daytime or at night.

It is an object of this invention to provide a light-detecting, electrooptical system capable of differentiating between the position of a bright object in a brightly illuminated field of view, said electrooptical system being capable of eliminating the background light and responding primarily to the light emitted by the bright object.

It is an additional object of this invention to provide a star tracking system having a much more favorable signal-to-noise ratio over the entire operating range of the system than in the known systems.

It is still another object of this invention to provide a star tracking system having a smaller angle spanned by the field of view of the optical system than the prior star tracking systems, this reduced field of view reducing the amount of skylight intercepted by the disclosed system to a small fraction of the skylight intercepted by the systems of the prior art without reducing angular tracking capabilities.

It is an additional object of this invention to provide a star tracking system in which the chord subtended by the angle of scan in the plane of the scanner is twice the diameter of the scanning disc as compared to a small fraction of the diameter in the systems known to the prior art.

It is also an additional object of this invention to provide a star tracking system having a smaller angle of view and smaller photo-sensitive surface than in the systems known in the prior art, which permits concentration of the intercepted light beam on a smaller photo-conductive surface with the concomitant gain in the signal-to-noise ratio which is a function of the area of the photo-conductive surface.

It is an additional object of this invention to provide a tracking system in which the star image is produced in the plane of the scanner and is nutated so that the circular path followed by the nutated image of the star is concentric with the scanner axis, or deviates from this concentric position, in which case it overlaps the transparent portion of the scanner only to a limited extent.

The novel features which are believed to be characteristic of the invention, both as to its organization and method of operation, together with further objects and advantages thereof will be better understood from the following description considered in connection with the accompanying drawings. It is to be expressly understood, however, that the drawings are for the purpose of illustration and description only, and are not intended as a definition of the limits of the invention.

Figure 6:
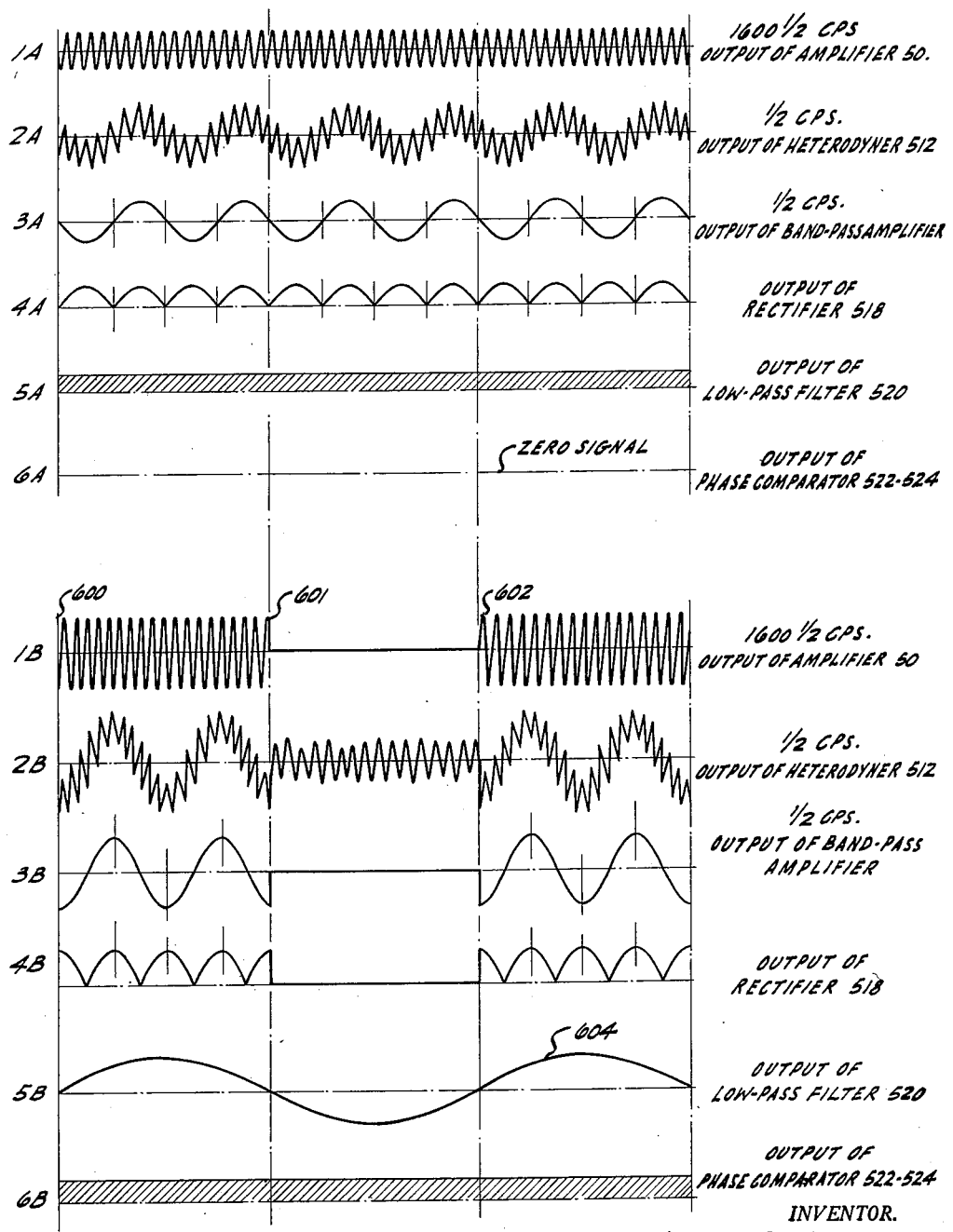

FIG. 1 is a side elevational view, partly in section, of a telescope;
FIG. 2 is a plan view of a scanner;
FIG. 3 is a plan view of a rotor of the scanner with explanatory possible paths of a star image;
FIG. 4 is a curve of the amplitude of useful tracking signal;
FIG. 5 is a block diagram of the tracking system;
FIG. 6 illustrates oscillograms of signals produced in the star tracking system.

Celestial guidance of a long range missile requires a photo-electric device, attached to a telescope, which will generate electrical signals in such a way as to drive the telescope automatically into alignment with a selected star in full daylight, when the order of sky illumination exceeds the order of illumination furnished by star a million times per angular degree.

The loss of visibility of the stars in daytime is due almost entirely to this increased brightness of the sky, and not to decreased brightness of the star. Hence, the chief factor governing daylight operation of a celestial guidance system is the extent to which this increased brightness can be prevented from producing an electrical signal.

It is obvious that if the field of view included by the telescope is smaller, a smaller amount of background illumination will be introduced by the sky.

It would appear, therefore, that it would merely be necessary to reduce the field of view of the telescope to an area comparable to the area of the star image in order to decrease the background illumination entering the telescope. In practice, however, other factors preclude the reduction in size of the field of view to so small an area. For example, relatively minute errors in the associated servo system during tracking permit the telescope to deviate from its "on-star" position by angles which are considerably greater than the angle subtended by the star.

In addition if the system is utilized to monitor gyros which maintain inertial reference lines, it would appear that the period of the correcting signal from the telescope should be relatively short in order to prevent the telescope from moving sufficiently, due to gyro drift, so that the star is lost from the telescope field of view. It has been found, however, that the period of the correcting signal from the telescope should be relatively long if optimum signal-to-noise ratio is to be obtained. Clearly, therefore, if the period of the correcting signal is to be relatively long, the field of view of the telescope must be made sufficiently large so that the star being tracked cannot be lost from the field of view during any one correcting signal period. Accordingly, it is evident that the problem is to provide a field of view which is small enough to cut down appreciably on the background light and which is large enough to permit a relatively long correcting signal period, thus providing a relatively high signal-to-noise ratio.

Since any telescope must have a finite size, it is clearly impossible to reduce the field of view included by the telescope indefinitely. The tracking itself requires that the scanner should have some finite dimensions greater than the star image, which demonstrates at once that the field of view of the telescope cannot be reduced indefinitely until the entire background light is eliminated.

It is also possible that the stars may not be visible to the telescope for short periods of time because of short flights through clouds or other reasons. It is desirable to make these periods as long as possible without permitting the telescope to drift far enough to lose the star. This, of course, means that large field of view angles are desirable.

It is also desirable to have a reasonably large field of view to facilitate the initial setting of the optical system on the desired stars. Finally, some finite dimensions must be used for making such elements of the star tracking system as the scanning disc since their size cannot be reduced for microscopic proportions purely because of the mechanical limitations. It thus becomes necessary to devise methods and structure which eliminate the bright background sky as a factor in the operation of the system so as to make the system respond primarily and, if possible, only to the light emitted by the star.

Besides reducing the field of view of the telescope, which thus reduces the total amount of background illumination, it is also possible to reduce the background illumination by using red stars and red or infra-red detectors. Such reduction is possible since the light scattered by the atmosphere is a function of the fourth power of the wave length, being strongest at the blue end of the spectrum.

If the infra-red region of operation is to be used, the most suitable infra-red detector available, at the present time, and the one which has the highest sensitivity in the short infra-red region, is the lead-sulphide photo-conductive cell. However, if lead-sulphide or similar photo-conductive cells are used as detectors, the signal-to-noise ratio is a function of the square root of the total photo-conductive area of the cell. In addition the bandwidth of the signal impressed on the photo-conductive surface also affects the signal-to-noise ratio because the noise is distributed over the entire frequency spectrum, and therefore the band-width of the frequency spectrum is inversely proportionate to the signal-to-noise ratio. Accordingly, in order to maintain a high signal-to-noise ratio with the detectors of the photo-conductive type, it becomes necessary to reduce the area of the photo-sensitive surface to an absolute minimum and, at the very same time, to keep the bandwidth of the impressed signal as low as possible.

The size of the area used in the photo-conductive cell is determined by the angle of the field of view of the optical system, and therefore if high signal-to-noise ratio is to be maintained with detectors of this type, the angle of field of view should be made as small as possible, since even after this angle is made very small, the ratio of skylight to starlight is still relatively large. It might appear advisable to devise a scanner which would narrow down the instantaneous field of view to a very small portion of the sky and then scan this field across the desired tracking field. The ratio of the skylight to the starlight can be improved very much by means of such a scanner, but only at the expense of increased bandwidth since bandwidth is approximately inversely proportional to the ratio of time duration of the star signal to the total time of scan. This ratio is very small in this type of scanner. Therefore, in order to maintain the signal-to-noise ratio as high as possible in a photo-conductive cell, the scanning of the star signal must be such as to make the star signal present as close to 50% of the time as possible since this corresponds to minimum possible bandwidth. In scanners of this type, the discrimination against the skylight is based upon the inherent differences between the light gradient of the nominally point source of a star and the area source of the background sky. A system of this type is disclosed in FIGS. 1 through 6.

Referring now to FIG. 1, light from a star and adjacent sky reaches the optical system of the telescope of the star tracker as a paralel beam of light 10 and passes through a glass wedge 12 mounted in a frame 14. Flat surface 15 of the glass wedge 12 is perpendicular to the optical axis 16 of the telescope, while the inclined surface 17 of the wedge is exposed to the beam of light 10. Frame 14 of the glass wedge 12 is supported by a telescope frame 18 and a ballbearing race 19 is inserted between the frames 18 and 14 for mounting wedge 12 in rotational relationship with respect to frame 18. Frame 14 is provided with a gear 20 which engages a pinion 21 mounted on shaft 22 of a constant speed synchronous motor 23.

The light, after passing through the glass prism 12, follows a path outlined by the light beam 24, whereupon it strikes a concave surface 25 of a reflector 26. An electrooptical system 27 is positioned in light-intercepting relationship with respect to reflector 26 and includes a window 28 having two flat surfaces made of a substance which is transparent to the infra-red radiation when filtering of the incoming light is desired. When the entire available spectrum is utilized, the window transparency matches the desired spectrum. Since a lead-sulphide cell responds only to the infra-red region of the spectrum, no filtering properties need be imposed on the window if this type of photocell is utilized.

A scanning disc 30 is interposed between window 28 and a condenser lens 32, the axis of the disc coinciding with axis 16 of the optical system and having its shaft mounted in jewel bearings inserted into recesses provided for this purpose in window 28 and condenser lens 32, these recesses not being shown for purposes of clarity. The outer periphery of the scanning disc 30, or the entire disc, is made of ferro-magnetic material which enables it to act as a rotor of the hysteresis motor of the type described in A.I.E.E. Proceedings, volume 66, 1947, by Herbert C. Roters, and entitled, "Hysteresis Motor Advances Which Permit Economical Fractional Horsepower Ratings." As described in the above article, the rotor must have a smooth outer rim to produce a uniform air-gap between the rotor and the stator of the hysteresis motor.

Referring now to FIG. 2, the stator consists of a spider 33 including a plurality of closed-slot magnetic pole pieces 34 which terminate in a continuous magnetic band of magnetic material 36 surrounding the rotor. Although this continuous band acts in part as a magnetic shunt between the pole pieces, and closes the air gap which normally would exist between the pole pieces 34, it produces a uniform flux distribution along the periphery of the rotor. This, in turn, reduces the spurious hysteresis rotor losses. Moreover, such structure is capable of delivering greater synchronizing torque, and is more efficient than the open-slot structure. The pole pieces 34 are provided with field windings 38 which produce a rotating magnetic field around rotor 30, thereby making rotor 30 rotate at the same speed as the angular speed of the field itself. High frequency of the order of 400 cycles per second may be impressed on the field windings 38, in which case rotational speed of the rotor may be as high as 24,000 revolutions per minute depending upon the number of pole pieces utilized.

The pole pieces, and the armature windings mounted on the pole pieces, are held by the outer frame 40 of the motor. This frame is provided with rings 42 and 44 which surround the outer ends of the radial members of spider 33, thus providing a low reluctance path for the flux produced by winding 38. As will be described more fully in connection with FIG. 5, the field windings 38 of the hysteresis motor are connected to a phase splitter 534 which in turn is connected to a frequency divider 536, and then to a local oscillator 514 which furnishes the necessary alternating current for producing the rotating magnetic field synchronized with the local oscillator. The advantages of using a hysteresis motor reside in the fact that it is a synchronous motor and it allows for convenient use of the motor as the scanning element in the optical system. This eliminates the use of any mechanical drive and substitutes an electro-magnetic drive therefor. Such substitution is a matter of paramount importance in star tracking systems of the type disclosed here because every possible effort should be made to eliminate the introduction of any mechanical vibrations into the telescope to avoid the generation of spurious signals. The light emanating from condenser lens 32 is then focussed on the photo-sensitive surface of the photo-conductive cell 48. The output signal from the photo-conductive cell 48 is impressed on pre-amplifier 50, and the output signal from the latter is impressed on the heterodyning circuit 512, FIG. 5, which will be described later.

A plan view of a typical scanning disc, according to this invention, is illustrated in FIGS. 2 and 3, FIG. 3 illustrating this scanner or episcotister on an enlarged scale. Examination of these figures discloses that the scanner consists of a disc with a plurality of transparent sectors 300 and an equal plurality of opaque sectors 302 uniformly distributed around the periphery of the disc. The central portion 304 of the scanner is opaque and has a diameter $d_2$, while the maximum diameter of the scanning portion of the episcotister is $d_1$. Diameter $d_2$ is usually chosen as $\frac{1}{2}d_1$ for ease of mechanical construction as well as for reducing the bandwidth of the frequencies generated by the episcotister, since making $d_2$ smaller would cause the signal frequency to increase when the star image is near the center of the episcotister, thereby necessitating a wider band-pass amplifier to pass the signal and consequently decreasing the signal-to-noise ratio. At the very same time, the gain in the signal when the star image is near the center would be too insignificant; therefore, elimination of the centrally located area is justified.

From the above description, it follows that the scanning element represents an episcotister with the central portion blocked by the non-transparent circular area 304. Accordingly, the rotor shaft and its jewel bearings can be mounted in window 28 and condenser lens 32 without producing any interference with the operation of the optical system.

Generally, episcotisters are used for reducing the intensity of illumination intercepted by an associated optical system. It could also be used for producing an amplitude-modulated or a frequency-modulated signal for determining the position of a bright object such as a star in terms of azimuth and elevation in star tracking systems, as disclosed for example in the copending applications for patents of Siegfried Hansen, entitled "Star Tracking System," Serial No. 771,762, filed September 2, 1947, now U.S. Patent No. 2,981,843, issued April 25, 1961, and "Electro-Optical Astrometrical Systems," Serial No. 188,401, filed October 4, 1950.

In the disclosed system, the scanner is used for producing a variable phase high frequency signal modulated by a low frequency signal which is used for obtaining proper azimuth and elevation signals which are impressed on azimuth and elevation servo amplifiers, respectively, and then on associated azimuth and elevation telescope positioning motors which keep the axis of the telescope pointed directly at the tracked star, as will be described more in detail in connection with FIG. 5.

As stated previously, the signal-to-noise ratio is an inverse function of the bandwidth, and therefore, it becomes desirable to keep the bandwidth as low as possible. One of the primary reasons for introducing the centrally located circular opaque area 304 is to avoid the introduction of unnecessary high frequency components into the tracking signals when the star becomes displaced from its coincidence with the position of the optical axis of the telescope. When the optical axis points directly at the star being scanned, its image is focussed on the scanning disc 30 by the concave mirror 25. At the very same time, rotation of prism 12 produces a concentric nutation of the star image along the outer periphery of the episcotister with the result that, as illustrated in FIG. 3, star 305 describes a circular path 306 which is concentric with the center 308 of the scanner and has a diameter equal to $d_1$. This path determines the angle between surfaces 15 and 17 of prism 12 since this angle should be sufficiently large to produce the nutation path 306.

When the axis of the telescope is deflected from its on-the-star position, a series of circular paths of successively larger eccentricity with respect to the optical axis 16 and the center 308 of the scanning disc will be produced. The maximum deflections which are still within the effective operating range of the system are illustrated by dotted circles 309 and 310 which indicate at once that if the diameter of disc 30 spans an angle of ½°, rotation of prism 12, when the axis of the telescope does not point at the star, will produce the paths 309 and 310, which are almost ½° to the left or to the right from the concentric path 306. Thus, for a ½° scanning angle subtended by the diameter of the episcotister, one is able to obtain, with the disclosed system, star tracking for approximately ½° in either direction. Stated differently, the effective overall operating angular range of the system is 1°, or an angle subtending a chord equal to twice the diameter of the episcotister, this angle being illustrated as $<\theta$ in FIG. 3. Strictly speaking, this angle will be a few minutes smaller than 1°, since when the circular paths 309 and 310 are tangent to the circular path 306, the image of the star makes only a point contact with the effective area of the episcotister and, therefore, for all practical purposes, is already lost by the star tracker. Obviously enough, the same degree of tracking is available whether the displacement of the axis of the telescope is in azimuth or elevation, or simultaneous deviation in azimuth as well as in elevation. Accordingly, it may be seen that the telescope of the present invention and its mode of operation permits almost a complete deflection of the circular path of the star away from the effective area of the episcotister, and as stated previously, produces a greater scanning angle, greater signal-to-noise ratio, and greater differentiation between the star image and background light.

In addition to the above advantages, the disclosed system has an additional marked advantage which is illustrated in graphic form in FIG. 4. This figure illustrates the amplitude of the useful tracking signal as the ordinate and the angular departure from the null position as the abscissa. The curve obtainable with the disclosed system is of the type illustrated at 400, while the curve obtainable with the known tracking systems is illustrated at 402, the latter being a straight line since the amplitude of the useful tracking system obtainable with the known systems is directly proportional to the angular departure of the star image from its null position. Line 402 is obtainable with the systems of the type disclosed in the previously mentioned application of Siegfried Hansen, Serial No. 188,401, filed October 4, 1950. In the above systems, the episcotister does not have the centrally located opaque portion such as area 304 in FIG. 3 and the diameter $d_1$, FIG. 3, of the episcotister as well as the nutation system are adjusted so that when the optical axis points directly at the star, the nutation circle bisects the radius of the episcotister. Accordingly, applying this geometry to FIG. 3, the null position of the star image in the prior systems corresponds to the path defined by the periphery 312 of the opaque area 304 in FIG. 3, which as mentioned previously, has a diameter which is equal to $$\frac{d_1}{2}$$

In the prior systems, the nutation is such that the circular nutation path 312 of the star normally never leaves the episcotister area unless the star tracking system, for some reason is not capable of functioning normally and therefore loses the star altogether. When this happens the system ceases to function. Comparison of the straight line 402 with curve 400 at once demonstrates that the system disclosed here furnishes maximum amplitude for the useful tracking signal at the time when it is needed most, i.e., when the star deflections from the null position are relatively small.

To illustrate this phenomenon in terms of actual quantitative values, when the deflections in the known systems, which produce the error signal of the type defined by line 402, are of the order of one minute, the amplitude of the error signal, in terms of signal to noise ratio, is of the order of $$\frac{S}{N} = \frac{\frac{K}{30}}{N}$$

while for the disclosed system, the same ratio is $$\frac{S}{N} = \frac{K}{N}$$

where K is the maximum amplitude of the useful tracking signal as illustrated in FIG. 4 and N is the amplitude of the noise signal.

From the above it follows that the intensity of the useful tracking signal in the disclosed system is approximately 30 times larger than the amplitude furnished by the known systems when the angular deviations are small. This striking difference in the amplitude of the useful tracking signal will become more apparent from the description of FIGS. 5 and 6 given below.

Referring now to FIG. 5, the entire telescope assembly, generally designated 500, includes the previously described prism 12, concave mirror 26, and electrooptical system 27. Prism 12 is rotated by means of the direct current motor 23 which is connected to a source 505 of direct current potential. As described previously, shaft 22 of this motor is connected to the prism through gear 20 and pinion 21. Because of the high reduction gear ratio, any minor variation in the speed of this motor will hardly reflect itself in the overall performance of the tracking system. Therefore, satisfactory results are obtainable when a direct current motor is used for this purpose. It is obvious that if absolute synchronism is desired, the direct current motor can be replaced with a synchronous motor in which case it may be connected to a local oscillator 514 of the system. Motor 23 is also used for energizing a phase reference switch which produces a ⅛ cycle per second square wave signal which is used in phase comparator circuits 522 and 524.

The telescope is mounted to be movable about horizontal axis 501 and vertical axis 502 and is supported by a U-shaped frame member 503 which permits rotation of the entire telescope structure around the vertical or azimuth axis 502, and the horizontal or elevation axis 501. Elevation motor 506 and azimuth motor 504 are provided for this purpose and are connected to gears 507 and 508 mounted on vertical and horizontal axes, respectively, through their respective pinions 509 and 510.

The output signal from the electrooptical system when the telescope is directed at a star is a continuous constant frequency signal of 1600½ cycles per second, as illustrated at 1A, FIG. 6. The particular frequency of 1600½ cycles per second is determined by the frequency at which the episcotister interrupts the focused radiant energy and is a function of both the speed of nutation and the speed at which the episcotister is rotated. Thus if the frequency at which the episcotister would interrupt a stationary image is 1600 cycles per second and the speed of nutation is ½ cycle per second, the resultant signal frequency at photocell 48 is 1600½ cycles per second if the direction of nutation is opposite to that of opiscotister rotation, whereas the signal frequency would be 1599½ cycles per second if both nutation and episcotister rotation were in the same direction. The waveform illustrated at 1A in FIG. 6 has a constant amplitude only when the optical axis of the telescope points directly at the star. When this is the case, the path of the star image on the episcotister corresponds to circle 306 in FIG. 3 and because of the concentricity of this path with respect to the center 308 of the episcotister, it is obvious that the signal produced will be of constant amplitude and constant frequency. The type of signals produced when the optical axis does not point directly at the star will be discussed later.

Referring again to FIG. 5, the constant amplitude, constant frequency signal is impressed on the photoelectric cell 48 and amplifier 50 whose output is impressed on a heterodyner 512, which is also connected to a 1600 cycle local oscillator 514. The output of heterodyner 512 is a substantially sinusoidal signal having a ½ cycle per second frequency due to the nutation of the star image. The noise frequencies are still present at this time and therefore the outline of the ½ cycle frequency signal has an envelope which is modulated by noise as illustrated by the wave-form shown at 2A in FIG. 6. This signal is impressed on a bandpass amplifier 516 which amplifies the ½ cycle frequency and eliminates the noise modulation producing a substantially sinusoidal wave 3A. This wave is then rectified in a rectifier 518, filtered in a low pass filter 520, and appears as a direct potential as illustrated by waveform 5A. Since phase comparators 522 and 524 do not respond to direct potential, their outputs are equal to zero when the axis of the telescope points directly at the star. Accordingly, servo amplifiers 526 and 528 do not impress any corrective potentials on the telescope positioning motors 506 and 504 at this time.

The operation of the system when the optical axis of the telescope does not point directly at the star is as follows. The signal appearing in the output of amplifier 50 is cyclically discontinuous as illustrated by waveform 1B. The amplitude of signal 1B is substantially twice the amplitude of signal 1A due to the fact that while in position 305, one-half of the image of the star is obliterated by the solid rim of the episcotister, whereas deflection of the telescope causes the star image to fall wholly within the episcotister area for a portion of each cycle.

The essentially constant-amplitude-constant-frequency signal from 600 to 601, 1B, FIG. 6, corresponds to the signal which is produced in the system when the star traverses the episcotister. From 601 to 602, the output of amplifier 50 is equal to zero since during this period, the star image is off the episcotister altogether, which for example in FIG. 3 corresponds to the path from point 320 counterclockwise to point 322 on circle 324. Heterodyner 512 eliminates the carrier frequency of 1600 cycles and an output signal of only ½ cycle per second, modulated by noise signals, will appear in its output 2B. The output signal from the bandpass amplifier 516 is illustrated by waveform 3B, the output signal from rectifier 518 by waveform 4B, and the output signal from low pass filter 520 by waveform 5B.

Assuming that the frequency of image nutation is equal to ⅛ seconds and that filter 520 is a low pass resistance-capacitance filter which will pass all frequencies up to and including ⅛ of a cycle per second, the signal appearing at the output terminals of filter 520 will be a substantially sinusoidal wave 604, 5B, whose period is equal to ⅛ cycle per second. This wave is impressed on the phase comparator circuits 522 and 524 where it is compared with the phase of the reference waves 530 and 532. A direct current signal such as illustrated by waveform 6B, FIG. 6, whose amplitude and polarity are functions of the angular deviation of the optical axis from its "on-star" position, will appear at the output terminals of the phase comparators. After being amplified in servo amplifiers 526 and 528, they are impressed on the telescope positioning reversible motors 506 and 504 for restoring the position of the telescope so that it points directly at the star.

What is claimed as new is:

1. A radiation source tracking system comprising a directable telescope for producing an image of said source in a plane, a scanning episcotister positioned in said plane of said image produced by said telescope, nutating means coupled to said telescope for cyclically nutating said image at constant velocity in a circular path on said episcotister to produce a high-frequency alternating radiation signal, said radiation signal being continuous when the axis of said telescope is directed at said source, said radiation signal having signal and no-signal periods upon deviation of said axis from said source, the sum of one signal period and one no-signal period being substantially equal to the period of one cycle of nutation of said image, the phase and duration of said on and off periods designating the direction and magnitude of the displacement of said telescope axis in azimuth and elevation from pointing directly at said source, and an electrical tracking device in radiation-intercepting relationship with respect to said telescope, said tracking system including signal converting means for producing a fundamental alternating electrical signal having a phase corresponding to the phase of said on and off periods of said radiation signal; first and second phase comparators coupled to said converting means and responsive to said fundamental alternating electrical signal for generating azimuth and elevation error signals, respectively, and azimuth and elevation motors controlled, respectively, by said azimuth and elevation error signals for pointing said axis at said source.

2. The radiation source tracking system defined in claim 1 in which said scanning episcotister is a rotor of a hysteresis motor, said hysteresis motor having field windings responsive to an applied reference signal for producing electromagnetic rotating field followed by said episcotister, and in which said electrical tracking device includes a heterodyner, a local oscillator connected to said heterodyner; a frequency divider interconnecting said local oscillator and said field windings whereby the radiation signal produced by rotation of said episcotister is in synchronism with the signal impressed on said heterodyner by said local oscillator.

3. A radiation source tracking system comprising an optical system, having an optical axis, for intercepting and focusing radiation from said source as a cyclically nutating image in a plane, said optical system having a rotatable scanner positioned in said plane and nutation means for nutating said image of said source along a circular path on said scanner, said scanner and said nutation means converting said radiation into high frequency radiation waves, said radiation waves being discontinuous during part of the nutation cycle when a displacement of the optical axis from said source occurs, the duration of the discontinuity of said signal being a function of the magnitude of said displacement, the phase of said discontinuity relative to the nutation cycle being a function of the direction of said displacement and an electronic translator in light-intercepting relationship, with respect to said optical system, said electronic translator being responsive to said radiation waves for converting said high frequency radiation signal into a corresponding high frequency electrical wave.

4. A star-tracking apparatus including an optical system having an episcotister-shaped rotatable scanner and nutating means for nutating an image of said star around the periphery of said episcotister, said scanner and said means transforming the light intercepted by said optical system from said star into a high frequency alternating signal, said signal having constant amplitude and constant frequency when the axis of said optical system points directly at said star, means keying said alternating signal at the nutation frequency when the axis of said optical system is deflected from said star; a photo-electric cell in light-intercepting relationship with respect to said optical system, said photo-electric cell converting said high frequency alternating signal into a corresponding high frequency alternating electrical signal, and a tracking channel connected to said photo-electric cell, said tracking channel including two phase comparators responsive only to said keyed alternating signal, and azimuth and elevation positioning motors electrically connected to said phase comparators and mechanically connected to said optical system, said motors pointing the axis of said system at said star in response to said keyed signals.

5. The radiation source tracking system defined in claim 1 wherein said electrical tracking device includes: a radiation sensitive translator positioned to intercept said high frequency radiation signal for converting said radiation signal into a corresponding high frequency electrical signal; a heterodyner coupled to said radiation sensitive translator for heterodyning said high frequency electrical signal to produce a low frequency electrical signal, said low frequency signal having signal and no-signal periods corresponding to the signal and no-signal periods, respectively, of said radiation signal; an electrical network, electrically coupled to said heterodyner, and responsive to no-signal periods in said low frequency electrical signal for producing said fundamental electrical signal, said fundamental electrical signal having a period substantially equal to the period of one cycle of nutation of said image, and wherein said nutating means includes: a constant speed nutation motor; a phase reference signal generator driven by said motor and having first and second output circuits for producing first and second reference signals, respectively, said first and second reference signals having a frequency equal to the nutation frequency of said image and being 90° out of phase with respect to each other, said first output circuit being connected to said first phase comparator, said second output circuit being connected to said second phase comparator.

6. An electrooptical apparatus for tracking a source of radiant energy, said apparatus including: movable optical means having an optical axis, said optical means being directable toward said source for focusing a portion of said energy as an image in a plane, said optical means including means for nutating said image at a predetermined frequency in a circular path in said plane, said path being centered about a predetermined point in said plane when said axis is directed at said source, said path being displaced in said plane relative to said predetermined point when said axis is deflected from said source; an optical heterodyner positioned in said plane to intercept said focused energy, said heterodyner modulating the intercepted focused energy to produce a high frequency radiation signal, said radiation signal being continuous when said path is centered about said predetermined point, said radiation signal being discontinuous when said path is displaced relative to said predetermined point, the phase and duration of the discontinuity of said signal being a function of the direction and magnitude of the deflection, respectively, of said axis from said source; radiation sensitive means positioned to intercept said radiation signal for translating said radiation signal into a corresponding electrical signal; and electrical means electrically coupled to said light-sensitive means and responsive to discontinuity in said electrical signal for producing a fundamental electrical signal, said fundamental electrical wave having a period equal to the period of one cycle of nutation of said image, the amplitude and phase of said fundamental electrical signal being a function of the magnitude and direction of said deflection of said axis from said source.

7. In an apparatus for tracking a source of radiant energy wherein said apparatus includes movable optical means having an axis, said means being directable for focusing a portion of said energy as an image nutating at a predetermined frequency about a circular path in a plane, and servo means responsive to an electrical signal derived from the position of said path in said plane for moving said optical means to direct said axis at said source, a system for deriving an electrical-position signal corresponding to the position of said path in said plane, said system comprising: a rotatable episcotister positioned in said plane to intercept a portion of the focused energy, said episcotister having a diameter equal to the diameter of said path; means for rotating said episcotister, said episcotister modulating the focused energy intercepted for producing a high frequency radiation signal, said radiation signal being continuous when said path coincides with the periphery of said episcotister, said radiation signal being discontinuous when said path diverges from said episcotister periphery, the phase and duration of the discontinuity of said radiation signal relative to the frequency of nutation being a function of the direction and magnitude, respectively, of the divergence of said path from said periphery; translating means, positioned to intercept said radiation signal, for converting said radiation signal to a corresponding electrical signal, and electrical means coupled to said translating means and responsive to discontinuity in said electrical signal for deriving a fundamental electrical signal having a frequency equal to said nutating frequency, the amplitude and phase of said fundamental signal being a function of the duration and phase of the discontinuity of said radiation signal.

8. An electrooptical apparatus for tracking a source of radiant energy, said apparatus comprising: a movable optical system having an optical axis and including means for intercepting and focusing a portion of said energy as an image cyclically nutating about a circular path in a reference plane perpendicular to said axis; an episcotister positioned in said reference plane and having an axis coincident with said optical axis, said episcotister having a diameter substantially equal to the diameter of said path and being rotatable for interrupting a portion of the focused energy to produce a high-frequency radiation signal, said radiation signal being continuous when said optical axis is directed at said source, said radiation signal being cyclically discontinuous in accordance with the nutation of said image when said axis is deflected from said source, the duration of the discontinuity of said radiation signal being a function of the magnitude of the deflection of said axis from said source; radiation-sensitive means positioned to intercept said radiation signal for translating said radiation signal into a correspondingly discontinuous high-frequency electrical signal; and electrical means coupled to said radiation-sensitive means and to said optical system, said electrical means being responsive to discontinuity in said high-frequency electrical signal for moving said optical system to direct said optical axis at said source.

9. The electrooptical apparatus defined in claim 8 in which said electrical means includes: a series circuit of a heterodyner for heterodyning said high frequency electrical signal to produce a correspondingly discontinuous low frequency electrical signal, a bandpass amplifier for passing only the low frequency component of said low frequency electrical signal, a rectifier for rectifying said low frequency component of said low frequency signal, and a low pass filter having a maximum pass frequency substantially equal to the frequency of nutation of said optical system and responsive to discontinuity in said low frequency component for producing a fundamental electrical signal having a frequency equal to the cyclic frequency of nutation of said optical system, the amplitude and phase of said fundamental electrical signal being a function of the magnitude and direction, respectively, of deflection of said axis from said source; and servo means electrically coupled to said low pass filter, said servo means being responsive to the magnitude and phase of said fundamental electrical signal for moving said optical system to direct said axis at said source.

10. An electrooptical apparatus for tracking a source of radiant energy, said apparatus comprising: a movable telescope, having an optical axis, for focusing a portion of said energy as an image in a plane; nutating means, coupled to said telescope, for nutating said image about a circular path in said plane at a predetermined fundamental frequency; a rotatable episcotister concentrically mounted with respect to said optical axis and having a diameter equal to the diameter of said path, said episcotister being positioned in said plane to intercept and modulate said focused energy for producing a high frequency radiation signal, said radiation signal being continuous when said axis is directed at said source, said radiation signal being cyclically discontinuous in accordance with the nutation of said image when said axis is deflected from said source, the duration of the discontinuity of said radiation signal being a function of the magnitude of the deflection of said axis from said source; radiation sensitive means positioned to intercept said radiation signal for translating said radiation signal into a correspondingly discontinuous high frequency electrical signal; and electrical means coupled to said radiation sensitive means and to said telescope, said electrical means being responsive to discontinuity in said high frequency electrical signal for moving said telescope to direct said axis at said source.

11. The electrooptical apparatus defined in claim 10 in which said episcotister includes a central, circular opaque area having a diameter $d_2$, and an effective episcotister area having a diameter $d_1$ and being concentric with said opaque area, the ratio of $d_1$ to $d_2$ being of the order of 2 to 1.

References Cited in the file of this patent

UNITED STATES PATENTS

| | | |
|---|---|---|
| 2,077,398 | Clark | Apr. 20, 1937 |
| 2,237,440 | Jones | Apr. 8, 1941 |
| 2,369,622 | Toulon | Feb. 13, 1945 |
| 2,421,012 | Chew | May 27, 1947 |
| 2,444,933 | Jasperson | July 13, 1948 |
| 2,462,925 | Varian | Mar. 1, 1949 |
| 2,513,367 | Scott | July 4, 1950 |